United States Patent [19]
Aritsuka et al.

[11] Patent Number: 5,185,848
[45] Date of Patent: Feb. 9, 1993

[54] NOISE REDUCTION SYSTEM USING NEURAL NETWORK

[75] Inventors: Toshiyuki Aritsuka, Nara; Akio Amano, Higashimurayama; Nobuo Hataoka, Kanagawa; Akira Ichikawa, Musashino, all of Japan

[73] Assignee: Hitachi, Ltd., Tokyo, Japan

[21] Appl. No.: 448,949

[22] Filed: Dec. 12, 1989

[30] Foreign Application Priority Data

Dec. 14, 1988 [JP] Japan .................. 63-313859

[51] Int. Cl.$^5$ ........................... G01L 7/08; G01L 5/06
[52] U.S. Cl. ........................................ 395/2; 395/22; 381/43
[58] Field of Search .................... 364/513; 381/43; 395/22, 2

[56] References Cited

U.S. PATENT DOCUMENTS 4,907,274 3/1990 Nomura et al. ................. 381/43
4,975,961 12/1990 Sakoe ............................... 381/43

OTHER PUBLICATIONS

"An Algorithm for Vector Quantizer Design", Linde et al., IEEE Trans on Comm. Jan. 1980.
"Noise Reduction Using Connectionist Models", Tamura et al, IEEE Proc. of ICASS p. 88, 1988.
"Vector Quantization: A Pattern-Matching Technique for Speech Coding", Allen Gersho and Valdimir Cupermand, IEEE, 1983.
"Parallel Distributed Processing", David Rumelhart and James McClelland, vol. 1, 1986.

Primary Examiner—Michael R. Fleming
Assistant Examiner—George Davis
Attorney, Agent, or Firm—Antonelli, Terry, Stout & Kraus

[57] ABSTRACT

A noise reduction system used for transmission and/or recognition of speech includes a speech analyzer for analyzing a noisy speech input signal thereby converting the speech signal into feature vectors such as autocorrelation coefficients, and a neural network for receiving the feature vectors of the noisy speech signal as its input. The neural network extracts from a codebook an index of prototype vectors corresponding to a noise-free equivalent to the noisy speech input signal. Feature vectors of speech are read out from the codebook on the basis of the index delivered as an output from the neural network, thereby causing the speech input to be reproduced on the basis of the feature vectors of speech read out from the codebook.

16 Claims, 6 Drawing Sheets

| INDEX | PROTOTYPE VECTOR |
|---|---|
| 1 | $k_{11}, k_{12}, k_{13}, \cdots k_{1n}$ |
| 2 | $k_{21}, k_{22}, k_{23}, \cdots k_{2n}$ |
| ⋮ | ⋮ |
| 256 | $k_{256\,1}, k_{256\,2}, \cdots k_{256\,n}$ |

FIG. 8

NOISE REDUCTION SYSTEM USING NEURAL NETWORK

BACKGROUND OF THE INVENTION

This invention relates to a noise reduction system for reducing noise contained in a speech signal when the speech signal is analyzed before being transmitted and/or recognized.

Various types of noise reduction systems based on, for example, a method using a close-talking microphone, a spectral subtraction method, a method using a plurality of microphones, and a filtering method have been proposed hitherto. The noise reduction system based on the method using a close-talking microphone utilizes the directivity of the microphone. In the noise reduction system based on the spectral subtraction method, noise only is previously registered, and this registered noise is subtracted from a noise-superposed speech signal. The noise reduction system based on the method using plural microphones utilizes, for example, the phase difference attributable to the different locations of the plural microphones. In the noise reduction system based on the filtering method, a speech signal only is extracted by filtering when the bandwidth of the speech signal differs from that of noise.

On the other hand, a neural network trained on the basis of a mapping of a set of speech waveform inputs containing noise and a set of speech signal outputs freed from noise has been proposed, as described in IEEE Proceedings of ICASSP (International Conference on Acoustics, Speech and Signal Processing) 88, pp. 553-556.

The conventional noise reduction systems described above, based on the method using the close-talking microphone have the problem of feasibility of usage due to the necessity for provision of the close-talking microphone. Also, conventional systems based on the spectral subtraction method and the filtering method are not fully satisfactory in that they are effective only when the characteristics of noise is already known. Further, conventional systems based on the method using the plural microphones have the problem of necessity for determination of suitable locations of the plural microphones required for noise reduction.

On the other hand, the method for reducing noise by the use of the neural network has the problem of degradation of the phonemic intelligibility of a noise-free speech output signal.

SUMMARY OF THE INVENTION

It is an object of the present invention to provide a noise reduction system in which, during transmission or recognition of a speech signal applied from a conventional sound collecting device, noise contained in the speech signal can be suppressed regardless of the kind of the noise and without degrading the phonemic intelligibility of the noise-suppressed speech signal, thereby improving the S/N ratio of the speech signal.

Another object of the present invention is to provide a noise reduction system which includes means for performing high-speed pre-processing of a speech signal to be transmitted or recognized.

The noise reduction system according to the present invention which attains the above objects is provides an analyzer for converting a noisy speech input signal into feature vectors (a set of feature quantities) such as autocorrelation coefficients, and a neural network receiving the feature vectors of the noisy speech signal as its input and extracting from a codebook, generated by previously clustering a set of feature vectors of a noise-free speech signal (a table storing prototype vectors of the feature vectors of the noise-free speech signal together with corresponding indices of the prototype vectors), an index of the prototype vectors corresponding to the noise-free equivalent of the speech input signal, so that the feature vectors of speech are read out from the codebook on the basis of the index delivered as an output from the neural network, and the speech input can be reproduced on the basis of the feature vectors of speech read out from the codebook.

The present invention utilizes the mapping function of the neural network so that feature vectors of noisy speech can correspond to feature vectors of noise-free speech. However, in the present invention, the former feature vectors do not directly correspond to the latter, and the manner of mapping is such that the former feature vectors are represented by the index of corresponding prototype vectors stored in the previously generated codebook. Because the speech is reproduced on the basis of the contents of the codebook storing feature vectors of noise-free speech, the reproduced speech is free from noise, so that the S/N ratio can be improved.

According to the noise reduction system of the present invention, the coding can be made at a high speed because calculations in the neural network only can attain the coding.

Feature vectors applied as an input to the neural network and feature vectors stored in the codebook may be of the same kind or different kinds. When, for example, feature vectors of different kinds are employed, autocorrelation coefficients can be selected as an input to the neural network, and partial autocorrelation coefficients (PARCOR coefficients) can be selected as contents of the codebook. Reproduction of speech on the basis of such partial autocorrelation coefficients can be easily achieved by means of very simple processing, and consequently the present invention can improve the S/N ratio and can attain high-speed processing for speech reproduction (synthesis).

When the noise reduction system according to the present invention is utilized for transmission of a speech signal, the analyzer and the neural network are disposed on the signal transmitting side, while the codebook is disposed on the signal receiving side. The neural network disposed on the transmitting side transmits its index output only to the receiving side, and, on the basis of the index transmitted from the neural network, the corresponding feature vectors are extracted from the codebook, so that the speech can be reproduced on the basis of the extracted feature vectors.

The process for training the neural network in the noise reduction system according to the present invention includes previously preparing typical noise and a noise-free speech signal, converting the noise-free speech signal into feature vectors, clustering the feature vectors, and selecting prototype vectors representing the clustered feature vectors so as to generate the codebook. Further, in the present invention, an index of the prototype vectors representing the most appropriate cluster of the corresponding feature vector is read out from the codebook to provide teacher data, while a set of feature vectors obtained by converting the speech signal having the noise superposed thereon is used as learning data, and the neural network is trained on the basis of the teacher data and the learning data.

After conversion of the noise-superposed speech signal into the feature vectors, those feature quantities affected less by noise among all the feature vectors are selected and applied as a vector input to the neural network, so as to improve the mapping performance thereby improving the S/N ratio of the speech signal. When, for example, autocorrelation coefficients are selected as the feature vectors, the coefficient of zeroth order representing power is most adversely affected by noise. Therefore, when the remaining coefficients except that of zeroth order are normalized, and the set of normalized coefficients is applied as an input to the neural network, the S/N ratio of the speech signal can be improved. Also, in this case, the maximum value among those of the remaining coefficients is selected as pseudo power, and this pseudo power is supplied to, for example, a synthesizer so as to recover the power information.

BRIEF DESCRIPTION OF THE DRAWINGS

FIG. 4($a$) shows one form of a neuron model constituting the neural network having the structure shown in FIG. 2.

FIGS. 4($b$), 4($c$) and 4($d$) show examples of the function f(·) used in the neuron model shown in FIG. 4($a$).

DESCRIPTION OF THE PREFERRED EMBODIMENTS

Preferred embodiments of the present invention will now be described in detail with reference to FIGS. 1 to 7.

Figure 1:
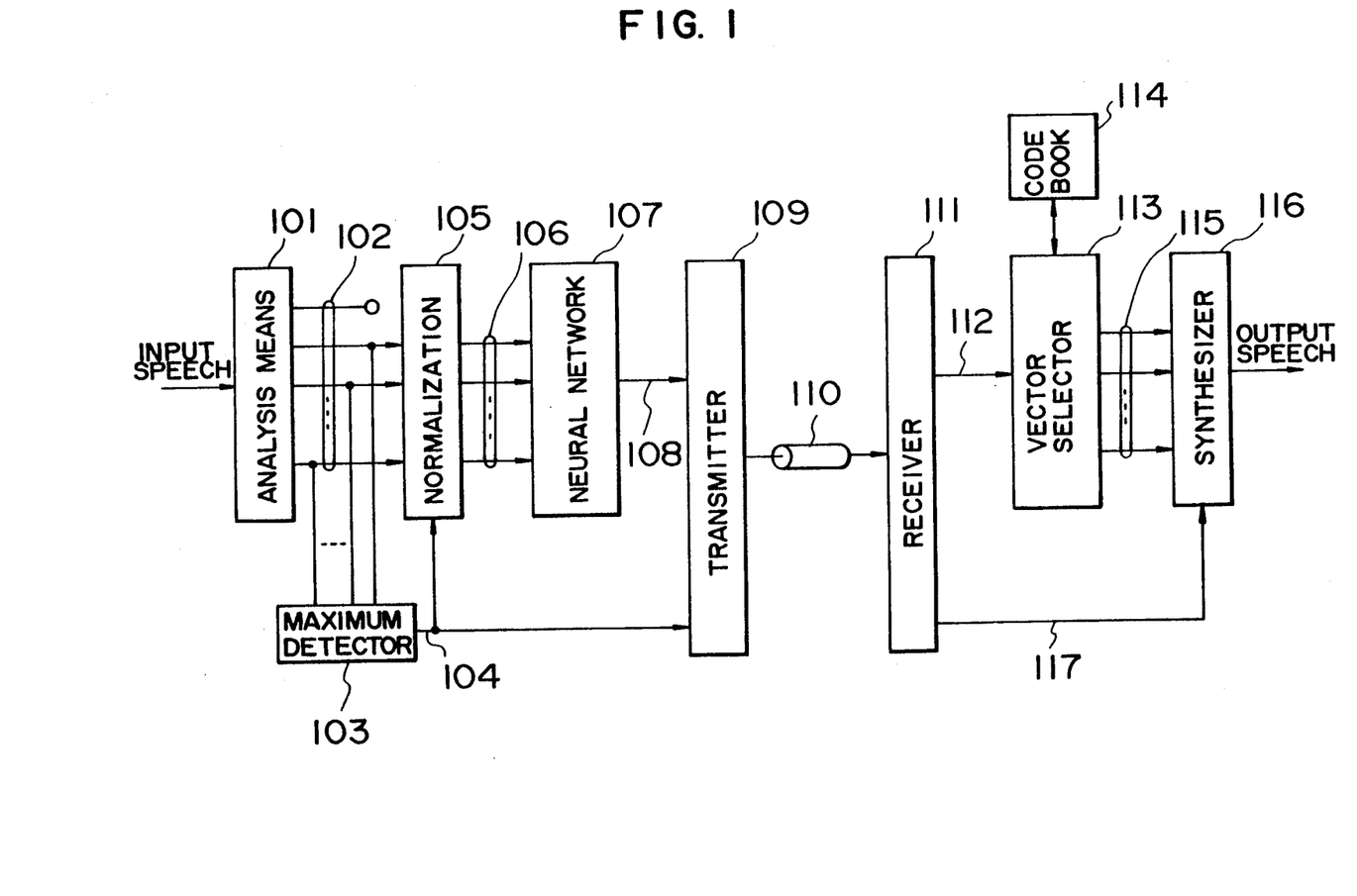
FIG. 1 is a block diagram showing the structure of a speech coding and decoding system in which an embodiment of the noise reduction system according to the present invention is incorporated in its speech pre-processing section so as to improve the S/N ratio of a speech signal.

FIG. 1 is a block diagram showing the structure of a speech coding and decoding system in which an embodiment of the noise reduction system according to the present invention is incorporated in its speech pre-processing section so as to improve the S/N ratio of a speech signal.

Figure 2:
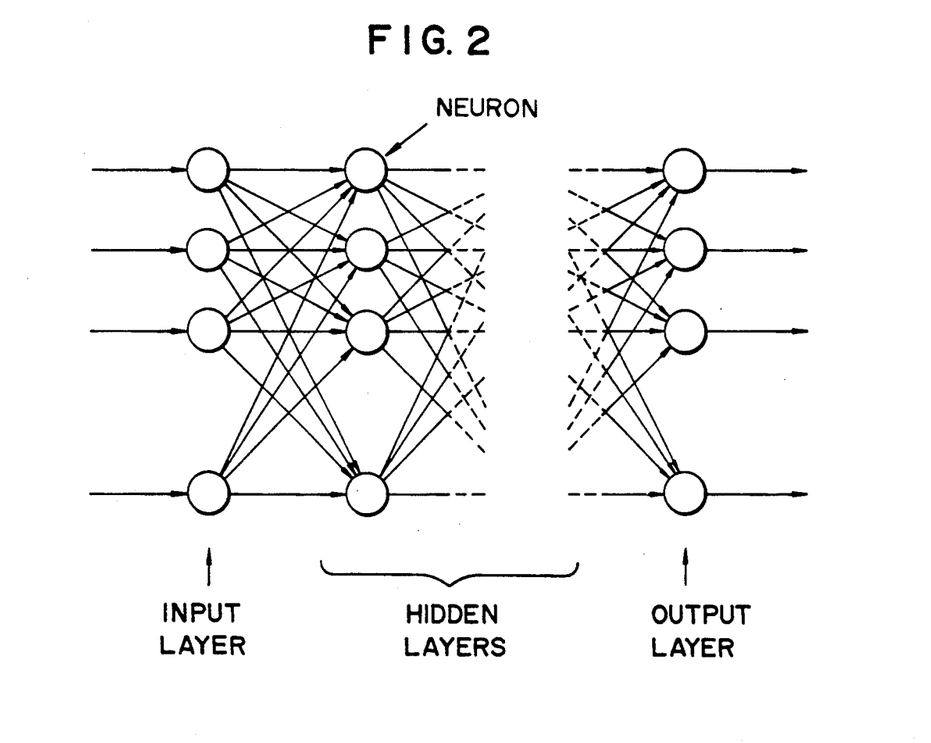
FIG. 2 shows one form of the neural network having a hierarchial structure.
Figure 3:
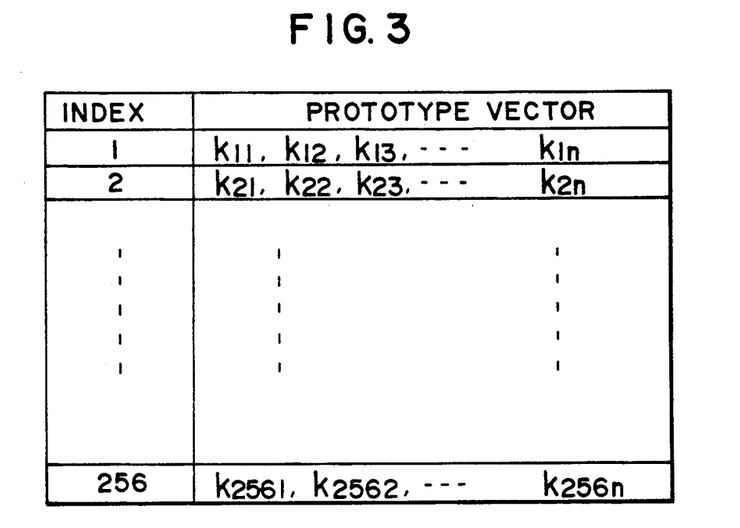
FIG. 3 shows the contents of the codebook shown in FIG. 1.

Operation of the speech coding and decoding system will now be described with reference to FIG. 1. First, a noisy speech input signal is applied to an analysis means 101 where the noisy speech input is converted into autocorrelation coefficients $v_0$ to $v_n$ 102 by known analyzing means. Then, from among the autocorrelation coefficients $v_l$ to $v_n$ except the coefficient $v_0$ of zeroth order which is most adversely affected by noise, a maximum detector 103 detects a maximum value $v_{max}$ 104 which represents pseudo power. The autocorrelation coefficients $v_l$ to $v_n$ 102 are then normalized by a normalization means 105, and the normalized autocorrelation coefficients $v_1'$ to $v_n'$ 106 are applied as an input to a neural network 107. As shown in FIG. 2, this neural network 107 has a hierarchial structure in which neuron units in an input layer, hidden layers and an output layer are interconnected by weighted links. In response to the application of the normalized autocorrelation coefficients $v_1'$ to $v_n'$ 106, the neural network 107 generates, as its output, an index signal 108 which indicates one set of prototype vectors stored in a codebook 114 which will be described later. The neural network 107 is previously trained by a method which will be described later. The index signal 108 appearing from the neural network 107 is transmitted, together with the maximum value $v_{max}$ 104 of the autocorrelation coefficients detected by the maximum detector 103, from a transmitter 109 to a receiver 111 by way of a signal transmission path 110. The transmitted, index signal 108 appears from the transmitter 111 as an index signal 112 which is applied to a vector selector 113. The vector selector 113 selects, from the codebook 114, one set of prototype vectors corresponding to the index indicated by the index signal 112. By a codebook generation method such as that described in IEEE TRANSACTIONS ON COMMUNICATIONS, VOL. COM-28, No. 1, JANUARY 1980, pp. 84-95, training for generating the codebook 114 is executed so that prototype vectors in each cluster correspond to partial autocorrelation coefficients $k_1$ to $k_n$ 115. More concretely, the codebook 114 is a table in which sets of prototype vectors and corresponding indices are stored as shown in FIG. 3. In response to the application of the selected partial autocorrelation coefficients $k_l$ to $k_n$ 115 from the vector selector 113, together with pseudo power $v_{max}$ 117 from the receiver 111, a synthesizer 116 synthesizes and generates the noise-suppressed speech signal.

Figure 4:
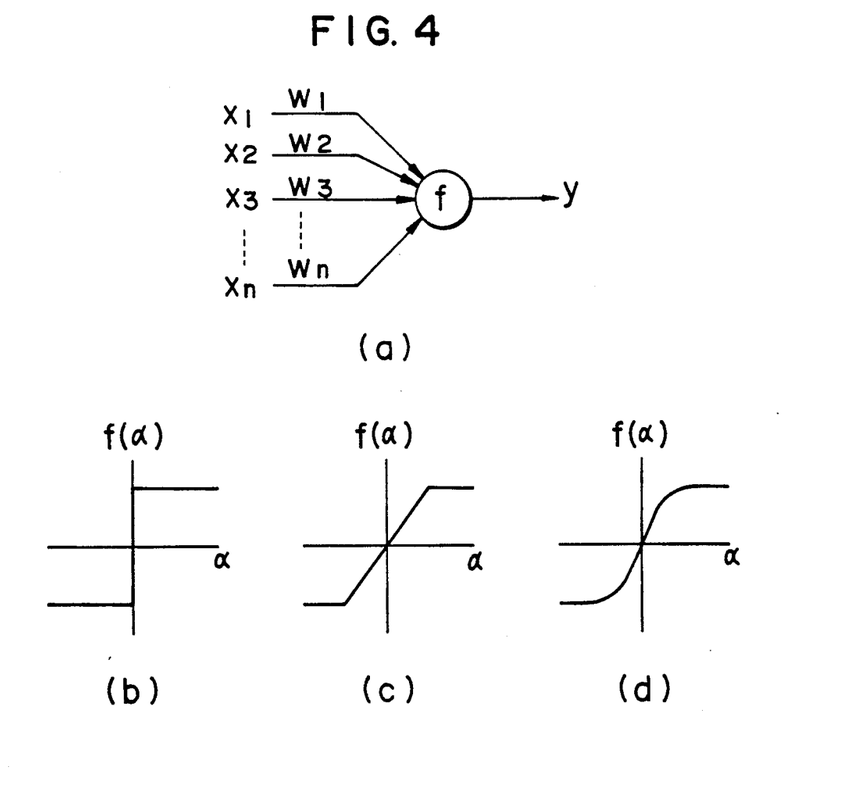

FIG. 4($a$) shows an example of a model of the neuron constituting the neural network 107. It will be seen in FIG. 4($a$) that inputs $x_l$ to $x_n$ are weighted by respective weights $w_l$ to $w_n$, and the sum of such weighted inputs is applied to the neuron. The neuron generates an output y which is a function f(·) of its inputs. Therefore, the output y is given by the following equation:

$$y = f\left(\sum_{i=1}^{n} w_i x_i + \theta\right)$$

where $\theta$ is an offset. FIGS. 4($b$), 4($c$) and 4($d$) show examples of the function f(·).

Figure 5:
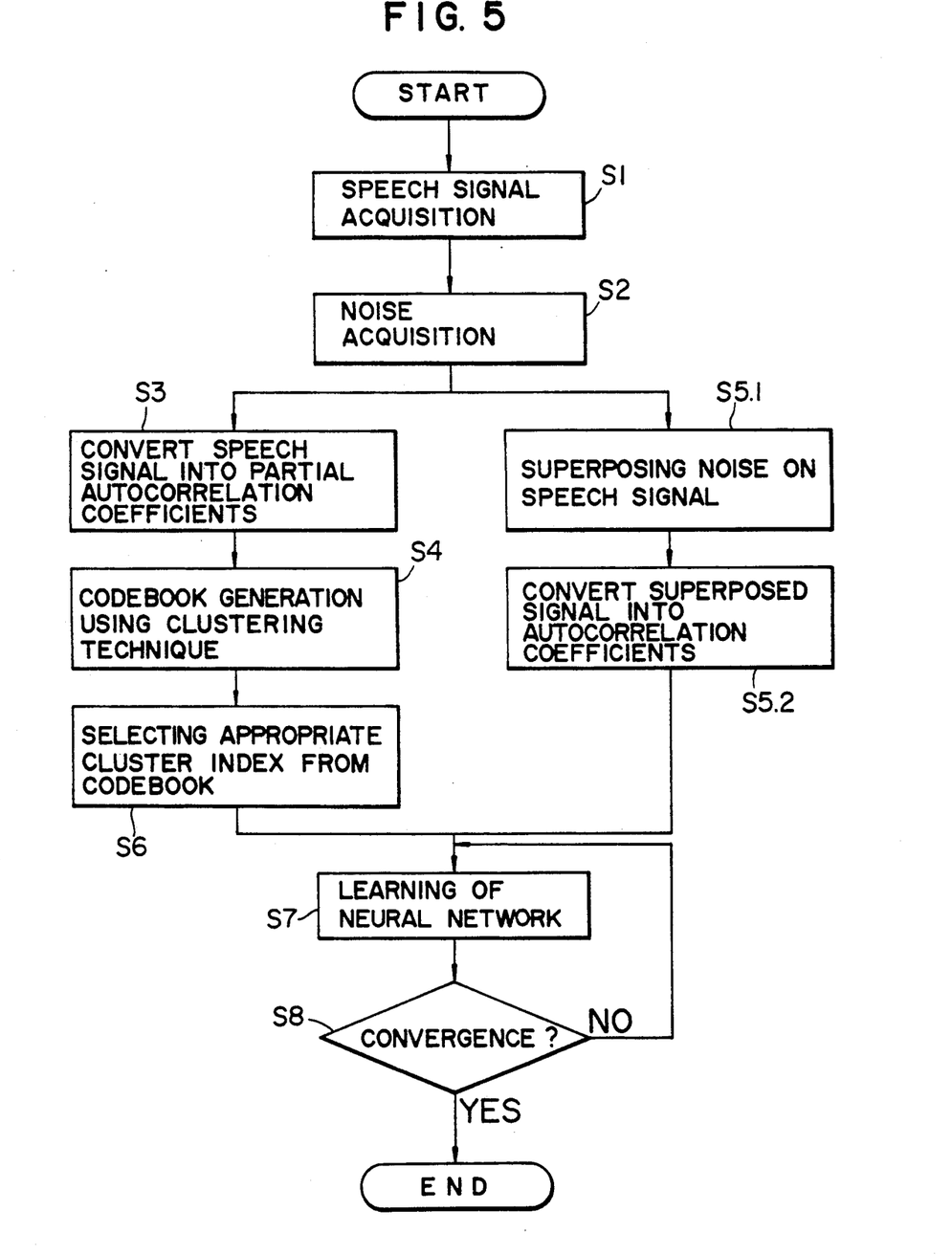
FIG. 5 is a flow chart of the steps of training a neural network having a structure as shown in FIG. 2.

FIG. 5 is a flow chart of the steps of training a neural network, which has a hierarchial structure formed of weighted interconnections of an input layer, hidden layers and an output layer as shown in FIG. 2, so that the neural network can realize the purpose of noise reduction. The algorithm will now be described.

Step 1

(S1) A noise-free speech signal which is most typically handled by a speech coding and decoding system to which the noise reduction system of the present invention is applied, is selected and applied to the noise reduction system. Such a speech signal is, for example, speech continuing for several minutes.

Step 2

(S2) Noise which occurs most typically in a speech input signal applied to the speech coding and decoding system, to which the noise reduction system of the present invention is applied, is selected and applied to the noise reduction system. Such noise is, for example, noise transmitted by way of a telephone line.

Step 3

(S3) All of the data of the speech signal applied in Step 1 are converted into partial autocorrelation coefficients.

Step 4

(S4) The clustering technique according to the codebook generation method described already is used for clustering and indexing the partial autocorrelation coefficients obtained in Step 3, thereby generating a codebook.

Step 5

(S5-1 and S5-2) The plural signal data obtained in Step 1 and the plural noise data obtained in Step 2 are superposed for all of their combinations, and the resultant data are converted into autocorrelation coefficients.

Step 6

(S6) The index representing the most appropriate cluster of prototype vectors corresponding to all the partial autocorrelation coefficients obtained in Step 3 is selected from the codebook.

Step 7

(S7) A learning set is prepared for all the autocorrelation coefficients obtained in Step 5. That is, the autocorrelation coefficients obtained in Step 5 are used as learning data, and the index selected in Step 6 for the corresponding signal data is used as teacher data. The learning set thus prepared is applied as an input to the neural network so as to train the neural network.

Step 8

(S8) Step 7 is repeated until the result of learning converges to a sufficiently small value.

Figure 6:
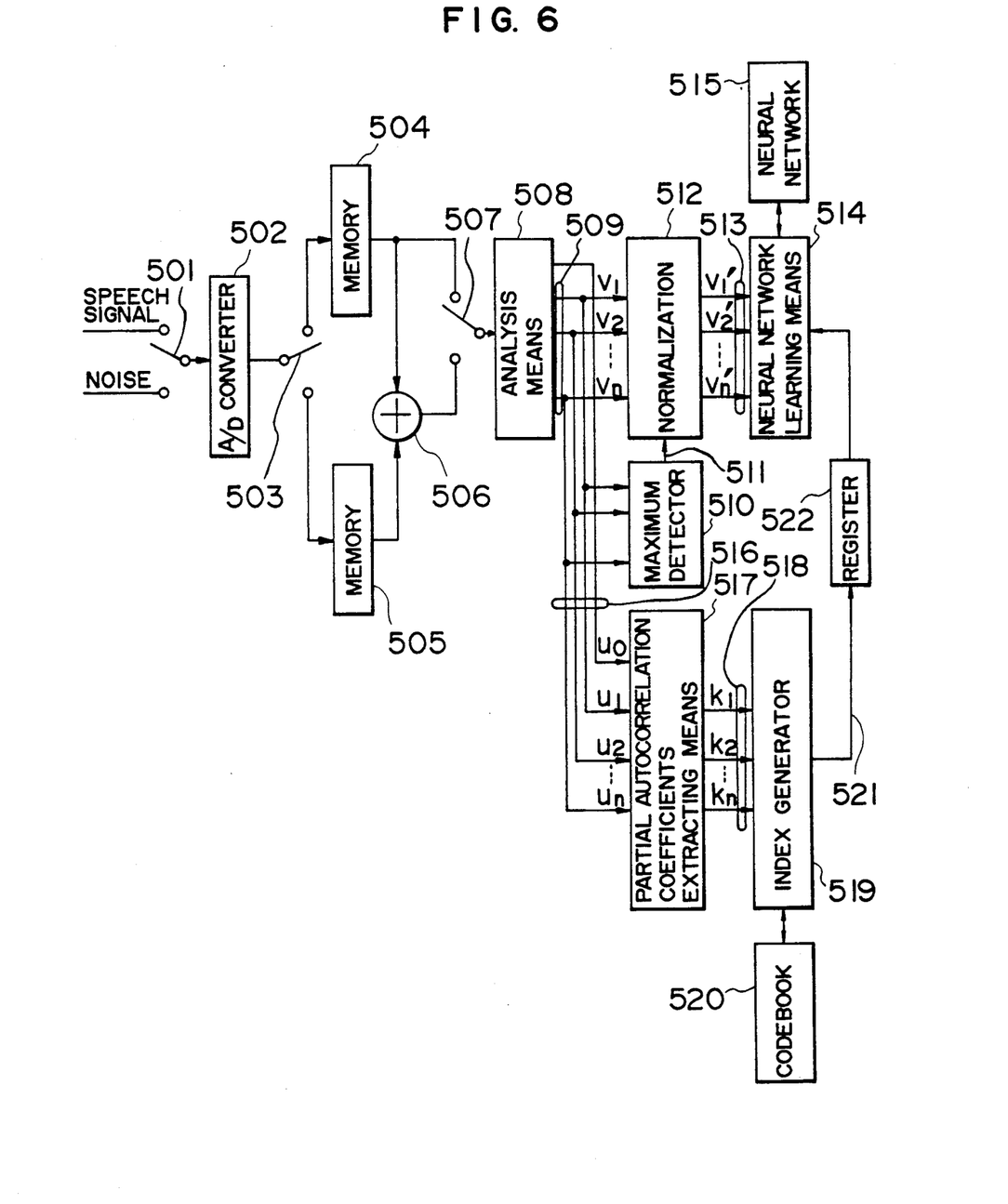
FIG. 6 is a block diagram showing the structure of a neural network training system for training a neural network having a structure as shown in FIG. 2.

FIG. 6 is a block diagram showing the structure of a neural network training system for training a neural network, which has a hierarchial structure formed of weighted interconnections of an input layer, hidden layers and an output layer as shown in FIG. 2, so that the neural network can realize the purpose of noise reduction.

Referring to FIG. 6, a noise-free speech signal which is most typically handled by a speech coding and decoding system, to which the noise reduction system of the present invention is applied, is applied to the neural network training system. Such a speech signal is, for example, speech continuing for several minutes. The noise-free speech input signal is first applied to an A/D converter 502 through a first switch 501, and, after A/D conversion by the A/D converter 502, the speech data signal is stored in a first memory 504 through a second switch 503.

Noise, which occurs most typically in such an environment and which is, for example, noise transmitted by way of a telephone line is also applied to the neural network training system. The noise is first applied to the A/D converter 502 through the first switch 501, and, after A/D conversion by the A/D converter 502, the noise data signal is stored in a second memory 505 through the second switch 503.

Then, the signal data read out from the first memory 504 and the noise data read out from the second memory 505 are superposed by a signal superposing means 506, and the noise-superposed speech data signal is applied to an analysis means 508 through a third switch 507 to be converted into autocorrelation coefficients $v_0$ to $v_n$ 509. From the autocorrelation coefficients $v_1$ to $v_n$ except that $v_0$ of zeroth order which is most adversely affected by the noise, a maximum detector 510 detects a maximum value $v_{max}$ 511 as pseudo power. The autocorrelation coefficients $v_1$ to $v_n$ are also normalized by a normalization means 512. The normalized autocorrelation coefficients $v_1'$ to $v_n'$ 513 are supplied to a neural network learning means 514 to be used as learning data for training a neural network 515 having a hierarchial structure as shown in FIG. 2.

The noise-free speech data signal read out from the first memory 504 through the third switch 507 is converted into autocorrelation coefficients $u_0$ to $u_n$ 516 by the analysis means 508. These autocorrelation coefficients $u_0$ to $u_n$ 516 are then converted by a partial autocorrelation coefficients extracting means 517 into partial autocorrelation coefficients $k_l$ to $k_n$ 518 suitable for speech synthesis. Prototype vectors representing a most appropriate cluster corresponding to the partial autocorrelation coefficients $k_l$ to $k_n$ are selected by an index generator 519 from a codebook 520, and an index signal 521 of the selected cluster is generated from the index generator 519. As described already, learning according to the codebook generation method is previously performed so that the prototype vectors in the individual clusters in the codebook 520 correspond to the partial autocorrelation coefficients $k_l$ to $k_n$ 518. The index signal 521 is applied through a register 522 to the neural network learning means 514 to be used as teacher data for training the neural network 515.

The learning data and the teacher data are supplied from the neural network learning means 514 to the neural network 515 with such timing that the learning data and the teacher data based on the same speech data 1 provide a learning set. The neural network 515 is trained according to such a mode.

Figure 7:
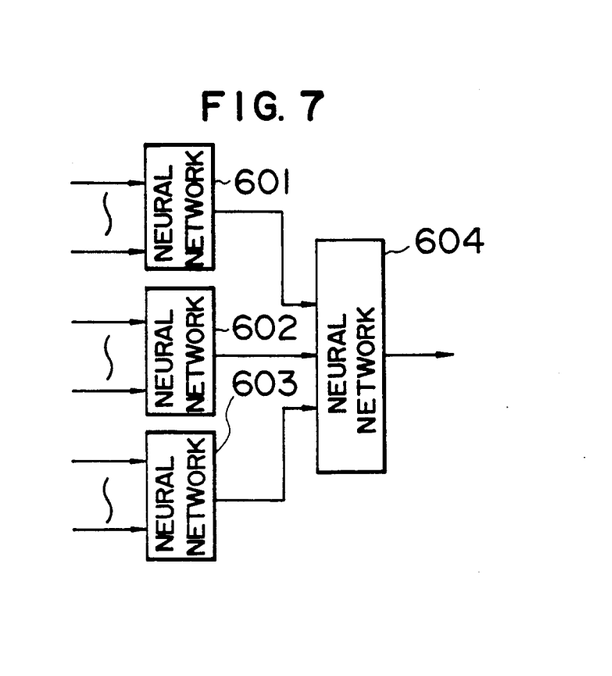
FIG. 7 shows the structure of a multi-stage neural network system consisting of four neural networks arranged in two stages.

In the illustrated embodiment of the present invention, the neural network has a hierarchial structure as shown in FIG. 2. It is apparent, however, that the function similar to that described above can also be exhibited by the use of a neural network of, for example, the Hopfield type or the Boltzmann's machine type, because the satisfaction of the specified relation between the input and the output is solely required for the neural network. Further, when the number of inputs to the neural network is large, a multi-stage neural network arrangement as shown in FIG. 7 can be employed so as to minimize the scale of the neural network system. FIG. 7 shows an example of a multi-stage neural network system consisting of four neural networks arranged in two stages. Referring to FIG. 7, input vectors divided into three groups are supplied to the first-stage neural networks 601, 602 and 603 respectively, and the outputs of these neural networks 601, 602 and 603 are supplied as inputs to the second-stage neural network 604.

Figure 8:
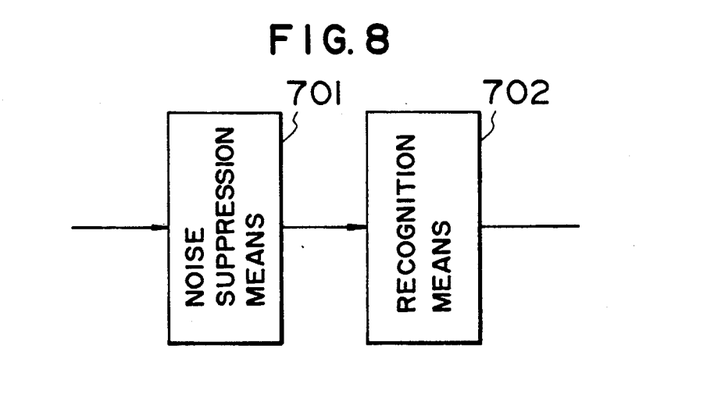
FIG. 8 is a block diagram showing the structure of a speech recognition system in which another embodiment of the noise reduction system according to the present invention is disposed in its speech pre-processing section.

FIG. 8 is a block diagram showing the structure of a speech recognition system in which another embodiment of the signal noise reduction system of the present invention is disposed in its speech pre-processing section. Referring to FIG. 8, a noise suppression means 701 according to another embodiment of the present invention suppresses noise contained in a noisy speech input signal, and a recognition means 702 recognizes the coded feature quantities of the speech.

According to the present invention, a noisy speech signal is analyzed to obtain feature vectors of such an input signal, and a neural network is used for extracting, on the basis of the feature vectors, the index of prototype vectors which represent a most appropriate cluster corresponding to feature vectors of speech not containing noise, so that noise can be fully suppressed by the use of the neural network. Further, because the prototype vectors representing the most appropriate cluster corresponding to the feature vectors of speech need not be searched by, for example, calculation of a minimum distorsion, and also because the index can be read by merely calculating the product and sum, the present invention provides such an advantage that the required processing of speech can be effected at a high speed.

Further, the adverse effect of noise can be minimized by using those feature quantities which are adversely affected less by noise than that of zeroth order. When, for example, autocorrelation coefficients are used as feature vectors, those coefficients except that of zeroth order which is most adversely affected by noise and used in the speech processing. In this case, the maximum value among those of the remaining coefficients is taken as pseudo power so as to recover the power information.

On the other hand, the convergence can be accelerated when the inputs to the neural network are normalized during learning. That is, the learned neural network can be used when a normalization means for normalizing characteristic vectors is provided.

Further, when a codebook disposed on the side of a synthesizer is generated as a result of learning such that prototype vectors in each cluster correspond to feature vectors used for speech synthesis, the period of time required for conversion between the feature vectors can be saved, thereby increasing the speed of processing for speech synthesis. For example, when autocorrelation coefficients are generated as an output of the analyzer, the adverse effect of noise is concentrated on the coefficient of zeroth order. On the other hand, when partial autocorrelation coefficients obtained by further processing the autocorrelation coefficients are used for speech synthesis in the synthesizer, a codebook storing the partial autocorrelation coefficients as the prototype vectors in each cluster is preferably used in the process of training the neural network. Such a codebook can be disposed on the side of the speech synthesis section, thereby eliminating the necessity for generating a new codebook. Further, even when the codebook storing the autocorrelation coefficients as the prototype vectors is used in the process of training the neural network, the autocorrelation coefficients can be easily converted into partial autocorrelation coefficients, so that the codebook disposed on the speech synthesis side can be simply generated.

What is claimed is:

1. A noise reduction system for transmitting a noise-suppressed speech signal, comprising:

speech analysis means for a analyzing a noisy speech input signal thereby converting the speech signal into feature vectors;

maximum detector means for detecting a maximum value from among the elements of said feature vectors obtained by said speech analysis means;

normalization means for normalizing values of the elements of said feature vectors on the basis of the maximum value detected by said maximum detector means;

a neural network for receiving said normalized feature vectors and extracting an index of a representative vector corresponding to a noise-free speech signal equivalent to said noisy speech input signal from a codebook generated by previously clustering a set of feature vectors of the noise-free speech signal and storing representative vectors of said feature vectors of the noise-free speech signal together with corresponding indices of said representative vectors; and transmitter means for transmitting both the maximum value detected by said maximum detector means from among the elements of said feature vectors and the index extracted from said codebook by said neural network.

2. A noise reduction system according to claim 1, wherein said maximum detector means detects the maximum value from among the elements of the feature vectors which are adversely affected less by noise among those obtained by said speech analysis means.

3. A noise reduction system according to claim 1, wherein said codebook is generated by previously preparing noise and a noise-free speech signal, converting the noise-free speech signal into feature vectors, clustering said feature vectors and selecting representative vectors representing the clusters of said feature vectors, and said neural network is trained using as teacher data the index of the prototype vectors representing a most appropriate cluster corresponding to said feature vectors and as learning data the feature vectors obtained by converting a noise-superposed speech signal consisting of the noise and the noise-free speech signal.

4. A noise reduction system according to claim 1, wherein said speech analysis means converts said noisy speech signal into autocorrelation coefficients.

5. A noise reduction system according to claim 4, wherein said maximum detector means detects the maximum value from among said autocorrelation coefficients except that of zeroth order which is most adversely affected by noise.

6. A noise reduction system according to claim 1 wherein said neural network has a hierarchial structure.

7. A noise reduction system according to claim 1, wherein said neural network has a structure of Hopfield type.

8. A noise reduction system according to claim 1, wherein said neutral network has a structure of Boltzmann's machine type.

9. A noise reduction system according to claim 1, wherein said neural network has a structure of multistage type in which a plurality of neural networks are arranged in series and in parallel.

10. A speech coding and decoding system comprising:

speech analysis means for analyzing a noisy speech input signal thereby converting the speech signal into feature vectors;

maximum detector means for detecting a maximum value from among the elements of said feature vectors obtained by said speech analysis means;

normalization means for normalizing the values of the elements of said feature vectors on the basis of the maximum value detected by said maximum detector means;

a neural network for receiving said normalized feature vectors and extracting an index of a representative vector corresponding to a noise-free speech signal equivalent to said noisy speech signal from a codebook generated by previously clustering a set of feature vectors of the noise-free speech signal and storing representative vectors of said features vectors of the noise-free speech input signal together with corresponding indices of said representative vectors;

transmitter means for transmitting both the maximum value detected by said maximum detector means from among the elements of said feature vectors and the index extracted from said codebook by said neural network;

receiver means for receiving and decoding information transmitted from said transmitter means;

vector selector means for receiving the transmitted index to select the representative vector corresponding to said index from said codebook and generating said selected representative vector as its output, said codebook storing representative vectors suitable for speech synthesis together with corresponding indices; and speech synthesizer means for synthesizing speech on the basis of said maximum value and said representative vector generated by said vector selector means as being suitable for the speech synthesis.

11. A speech coding and decoding system according to claim 10, wherein said speech analysis means converts said noisy speech signal into autocorrelation coefficients.

12. A speech coding and decoding system according to claim 10, wherein said representative vectors suitable for speech synthesis are partial autocorrelation coefficients.

13. A noise reduction system according to claim 10, wherein said neural network has a hierarchial structure.

14. A noise reduction system according to claim 10, wherein said neural network has a structure of Hopfield type.

15. A noise reduction system according to claim 10, wherein said neutral network has a structure of Boltzmann's machine type.

16. A noise reduction system according to claim 10, wherein said neural network has a structure of multistage type in which a plurality of neural networks are arranged in series and in parallel.

* * * * *